BASIC CONFIGURATION

EQUIVALENT CONFIGURATION

INVENTOR
JAMES S. SHREVE
BY Henry M. Saragovitz, Edward J. Kelly, Herbert Berl and John D. Edgerton
ATTORNEY INVENTOR
JAMES S. SHREVE
BY Harry M. Saragovitz, Edward J. Kelly, Herbert Berl and John L. Edgerton
ATTORNEY

OVERALL CONFIGURATION FOR SYSTEMS I & II

SINGLE PRF OUTPUTS

INVENTOR
JAMES S. SHREVE
BY Harry M. Saragovitz, Edward J. Kelly, Herbert Berl and J. D. Edgerton
ATTORNEY

DETAILS FOR SYSTEMS I & II

INVENTOR
JAMES S. SHREVE
BY Harry M. Saragovitz, Edward J. Kelly, Herbert Berl and J. D. Edgerton
ATTORNEY INVENTOR
JAMES S. SHREVE
BY Harry M. Saragovitz, Edward J. Kelly, Herbert Berl and J. D. Edgerton
ATTORNEY

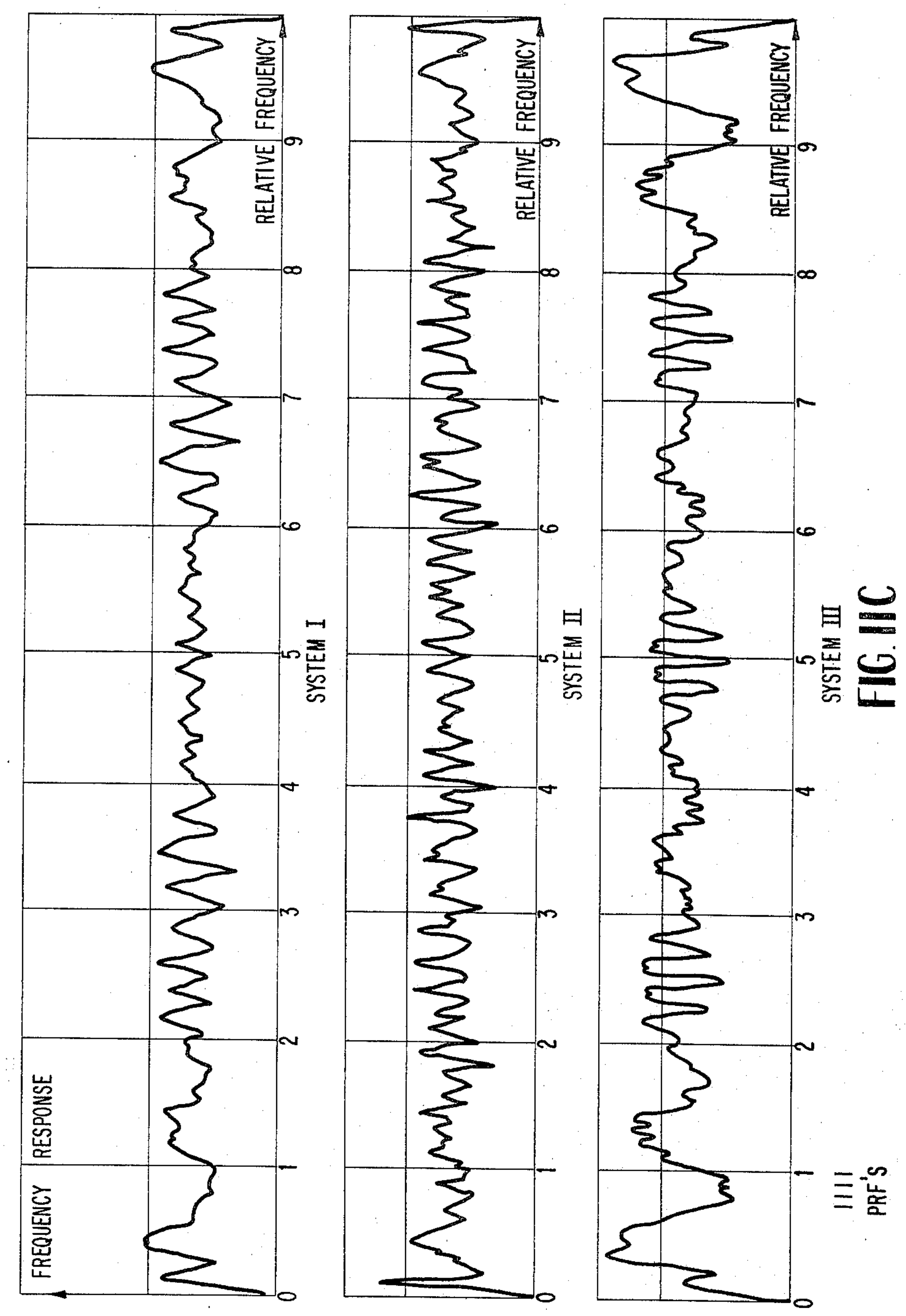
FIG. IIA FIG. IIB FIG. IIC
INVENTOR
JAMES S. SHREVE
BY Harry M. Saragovitz, Edward J. Kelly, Herbert Berl and J. D. Edgerton
ATTORNEY

FILTER C RESPONSE

SYSTEM I RESPONSE

INVENTOR
Harry M. Sarazin
BY Edward J. Kelly, Herbert Berl
and J. D. Edgerton
ATTORNEY INVENTOR
JAMES S. SHREVE
BY Harry M. Saragovitz, Edward J. Kelly, Herbert Berl and J. D. Edgerton
ATTORNEY

DETAILS FOR SIMPLIFIED FIVE-PULSE SYSTEM

INVENTOR
JAMES S. SHREVE
BY Harry M. Saragovitz, Edward J. Kelly, Herbert Berl and J. D. Edgerton
ATTORNEY United States Patent Office 3,480,953

Patented Nov. 25, 1969

3,480,953

MOVING TARGET INDICATOR HAVING STAGGERED PULSE REPETITION FREQUENCY

James S. Shreve, Arlington, Va., assignor to the United States of America as represented by the Secretary of the Army Filed May 17, 1968, Ser. No. 730,194

Int. Cl. G01s 9/42

U.S. Cl. 343—7.7 7 Claims

ABSTRACT OF THE DISCLOSURE

Disclosed is a moving target indicator utilizing pulse-Doppler radar techniques in which the transmitted pulse train has a staggered multiple repetition frequency. A weighted digital filtering system is incorporated in the receiver for eliminating ambiguous echo returns from stationary second time-around targets. The system eliminates the blind speed and blind range problems evidenced by previous pulse-Doppler systems operating above L-band frequencies.

This invention relates to a pulse-Doppler radar detector more commonly referred to as a moving target indicator, and in particular to an MTI employing a staggered pulse repetition frequency so as to eliminate ambiguous and blind ranges and/or speeds evidenced by prior moving target indicators.

As is well known, moving target indicators are pulse radar echo devices used to discriminate in favor of moving targets while suppressing the returns from stationary objects such as ground clutter echoes. Moving target indicators operate on the Doppler effect such that the echo from the target moving toward or away from the radar evidences a phase shift of an amount proportional to its radial velocity toward or away from the radar transmitter. In order to distinguish from fixed targets which exhibit no pulse-to-pulse phase difference, echo pulses are stored in the moving target indicator and differences between consecutive echoes are analyzed and used to activate the MTI output.

Pulse Doppler radar systems above L-band (i.e., above about 1,000 megahertz) usually run into the problem of either having blind ranges or blind Doppler speeds or both. If the pulse repetition frequency is high, range becomes ambiguous, and at certain ranges the return signal coincides with the transmission of a new pulse. If the pulse repetition frequency is low, similar comments apply to the Doppler frequencies; beside causing Doppler frequencies to become ambiguous, in this case a return signal may have a Doppler frequency which coincides with one of the spectral lines of the transmitter. Receiver signal processors which remove clutter at these frequencies will also remove signals at these same frequencies—hence "blind speeds" arise.

The present invention avoids the above-mentioned difficulties by providing a moving target indicator in which the pulse repetition frequency is staggered. It further provides a novel filtering arrangement for eliminating ambiguous signals which might otherwise result from so-called "stationary second-time-around" targets. That is, staggering the pulse repetition frequency tends to alleviate the blind speed problem but causes a stationary target beyond the unambiguous range to appear as moving targets at two or more closer ranges. The filter system of the present invention removes these "stationary second-time-around" targets while retaining the advantages with regard to the elimination of blind speeds and blind ranges.

It is therefore one object of the present invention to provide an improved pulse Doppler radar system.

Another object of the present invention is to provide an improved moving target indicator which eliminates the problem of blind ranges and/or blind speeds.

Another object of the present invention is to provide an improved moving target indicator utilizing a staggered pulse repetition rate. Incorporated in the moving target indicator is a novel filter and storage system for eliminating any ambiguous signals which may arise from stationary targets beyond the unambiguous range because of the multiple pulse repetition frequency of the transmitted signals.

Another object of the present invention is to provide a novel digital filter circuit for eliminating ambiguous echo returns from stationary second-time-around targets.

These and further objects and advantages of the invention will be more apparent upon reference to the following specification, claims and appended drawings wherein:

FIGURES 11A, 11B and 11C show the frequency response for the same systems using a staggered multiple (four) pulse reptitition frequency;

Figures 1A, 1B:
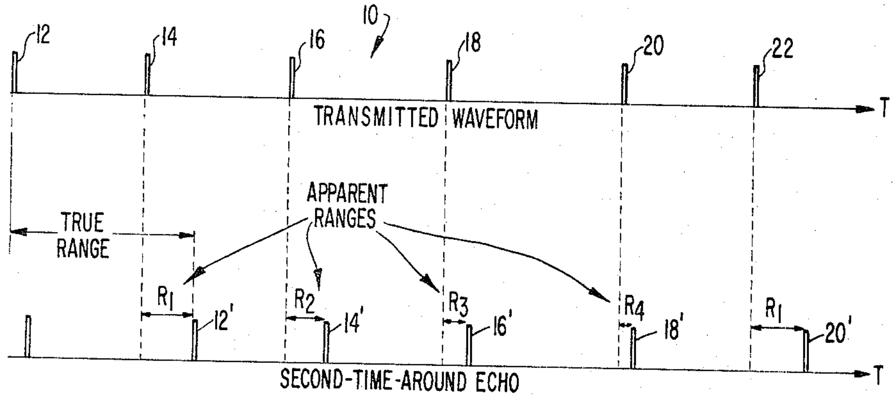
FIGURE 1A shows a transmitted pulse wave form having four different pulse repetition frequencies.
FIGURE 1B illustrates a typical second-time-around echo resulting from the wave form of FIGURE 1A.

In the moving target indicator of the present invention, the transmitter sends out a pulse train of the type illustrated at 10 in FIGURE 1A, comprising individual pulses 12, 14, 16, 18, 20 and 22. It is understood that FIGURE 1A represents only a portion of the pulse train and the sequence is repeated. However, the portion of the train illustrated at 10 in FIGURE 1 indicates that the pulse train has a staggered pulse repetition frequency and in fact is comprised of a system having four different pulse repetition frequencies. FIGURE 1B shows the second-time-around echo pulse train with the individual echo pulses corresponding to the transmitted pulse in FIGURE 1A carrying a suitable prime. It can be seen from a comparison of FIGURE 1A and FIGURE 1B that the stationary second-time-around pulses illustrated in FIGURE 1B possess Doppler frequencies such that unless compensated for give a false indication of moving targets within the unambiguous range as determined by the transmission pulse rate.

Figure 1C:
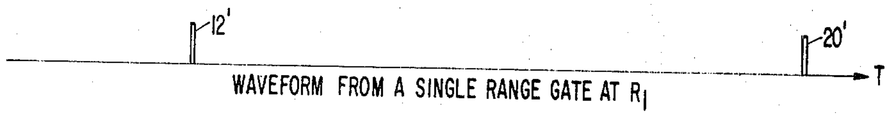
FIGURE 1C shows the wave form from a single range gate located at $R_1$.
Figure 1D:
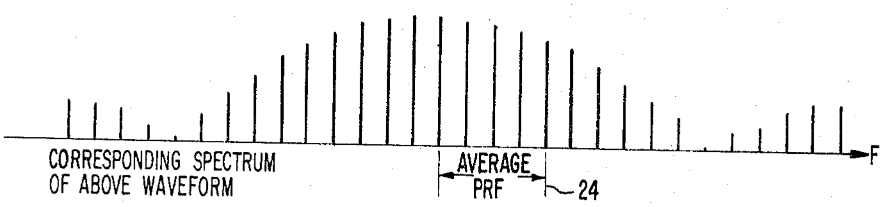
FIGURE 1D shows the corresponding frequency spectrum for the wave form of FIGURE 1C.

In general, stationary second-time-around target echoes hereafter referred to as SSTAT echoes have frequency components that stationary or moving first-time-around target echoes do not have. In a two-PRF system, a single SSTAT will produce signals in two range cells, each video signal appearing as if it had Doppler frequencies simultaneously at zero and one-half the average PRF. In a three-PRF system, three range cells will display signals each having pseudo-Doppler frequencies at zero, one third, and two thirds the average PRF. Likewise, in a four-PRF system, it will appear that Doppler frequencies of zero, one-fourth, one-half and three-fourths are produced. This arises, of course, because the echo is present in a given range cell every fourth period, and thus appears as a pulse train at one-fourth the average PRF. This is illustrated in FIGURE 1C which shows the wave form for a single range gate at R1. Only echo pulses 12′ and 20′ are seen in this range gate. FIGURE 1D shows the corresponding frequency spectrum of the wave form of FIGURE 1C and the average pulse repetition frequency is indicated at 24. Any given first-time-around target echo has only one Doppler frequency, that corresponding to the actual radial velocity of the target.

A system which subtracts the amplitude of the signal at frequencies of one-fourth and three-fourths the average PRF from that at one-half the average PRF (for every range cell) would appear to eliminate SSTAT signals. However, it is not possible to simply employ a linear filter having an appropriate response. The reason is that the instantaneous signal at the two frequencies can be made to cancel at only one relative phase angle but not at all phase angles. Since the signals are at different frequencies, the relative phase changes with time. Time averaging could be employed to produce a zero output but then every input signal would produce a zero output.

Figure 2:
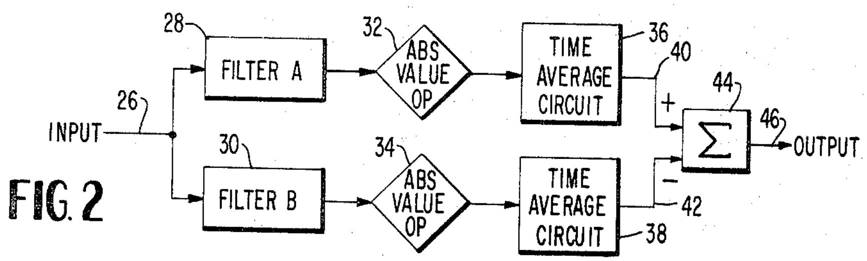
FIGURE 2 is a simplified block diagram of the basic second-time-around signal elimination circuit incorporated in the moving target indicator of the present invention.

A solution to the problem is provided by the basic configuration illustrated in FIGURE 2 where the echo signals are supplied by way of an input lead 26 to a pair of filters 28 and 30 labeled filters A and B, respectively. The outputs from these filters pass through a pair of absolute value operators 32 and 34 to a pair of time averaging circuits 36 and 38. The outputs from the averaging circuits are supplied by way of leads 40 and 42 to the two inputs of a summing network 44 with the output appearing on lead 46.

Figure 3:
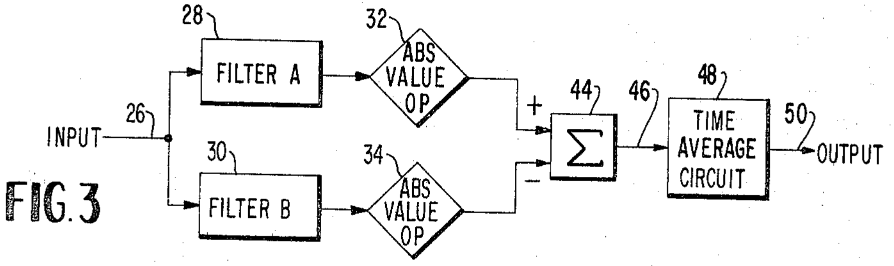
FIGURE 3 is a simplified circuit diagram of a slightly modified second-time-around target cancellor.

FIGURE 3 shows a modified basic construction similar to that of FIGURE 2 with like parts bearing like reference numerals. In the circuit of FIGURE 3, the output from the absolute value operators 32 and 34 are supplied directly to the summing network 44 and its output 46 is connected to a time averaging circuit 48 with the system output appearing at 50.

Because of the different phase angles of the different frequency circuits, it is necessary to obtain a measure of the amplitude (such as the peak value or some function thereof) of the signal at each frequency before performing the subtraction or cancellation. This requires two filters each employing a non-linear element followed by a time-averaging device. In an analog system a peak detector or bridge rectifier can be used for the non-linear element. In the preferred digital system of the present invention, the non-linear element takes the form of an absolute value operator such as the operators 32 and 34 in FIGURES 2 and 3. These operators are simply registers which "forget" the algebraic sign.

Figure 4A:
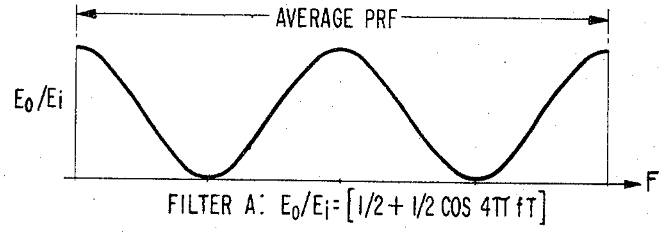
FIGURES 4A and 4B show filter responses for the filters used in the systems of FIGURES 2 and 3.
Figure 4B:
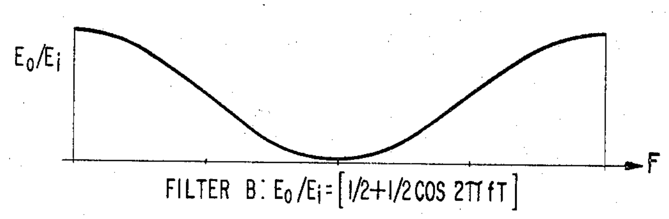

Filter 28 designated Filter A in FIGURES 2 and 3 must be sensitive to a frequency of one-half the average pluse repetition frequency and insensitive to a frequency of one-fourth and three-fourths the average PRF for a four pulse repetition system. The filter designated B, i.e., filter 30, must be sensitive to frequencies of one-fourth and three-fourths the average PRF and insensitive to one-half the average PRF. Filters having the responses illustrated in FIGURES 4A and 4B meet this criteria, FIGURE 4A showing the appropriate response for the filter 28 of FIGURES 2 and 3 and FIGURE 4B showing the appropriate frequency response for the filter 30 of FIGURES 2 and 3.

Figure 5:
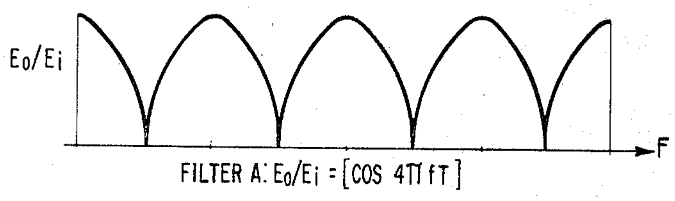
FIGURE 5 shows the filter response for an alternate type filter usable in the systems of FIGURES 2 and 3 in place of the filter of FIGURE 4A.

Although it is not readily apparent, a filter having the response illustrated in FIGURE 5 may be used as the filter 28 in the systems of either FIGURE 2 or FIGURE 3. In analyzing these filter responses, it must be borne in mind that each filter and absolute value operator constitutes a non-linear subsystem. The output produced by such a subsystem for a signal having two frequency components is not necessarily the sum of the outputs that would be produced by signals at the two frequencies if applied separately.

Figure 6:
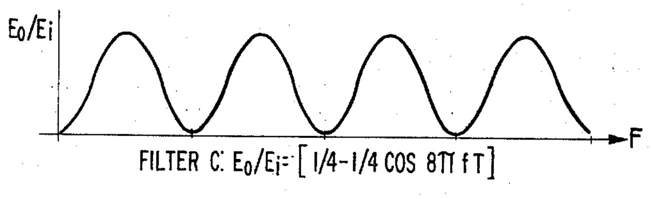
FIGURE 6 shows the response for an additional filter usable with the circuits of FIGURES 2 and 3.

As was previously mentioned, a single first-time-around target in any given range cell will produce a signal at a single Doppler frequency. With the systems of FIGURES 2 and 3, it is possible to determine specific non-zero Doppler frequencies where first-time-around target signals will cancel for a specific pulse repetition frequency. These frequencies lie between the spectral lines of the SSTAT signals and hence may be treated separately by a filter sensitive to all frequencies except zero, one-fourth, one-half and three-fourths the average PRF. A suitable response for a filter of this type is illustrated in FIGURE 6.

Figure 7:
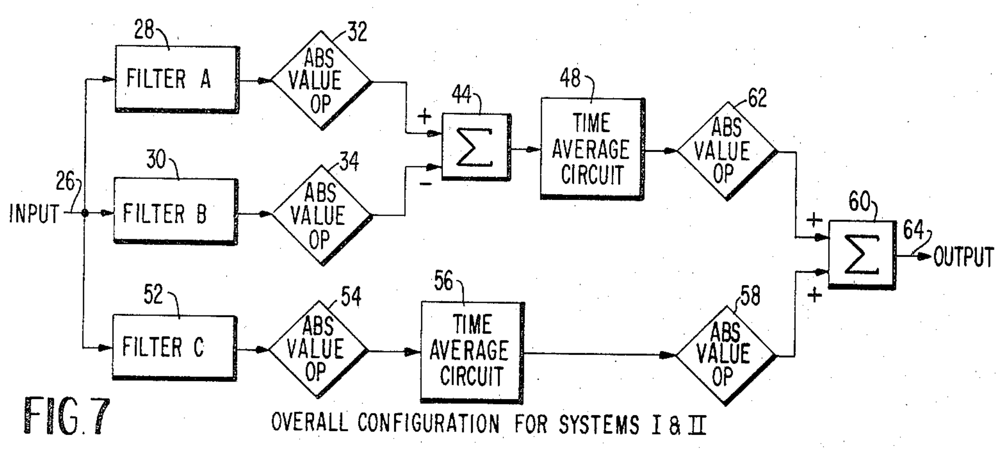
FIGURE 7 is a more detailed block diagram of a second-time-around cancellation circuit incorporating an additional filter having the response illustrated in FIGURE 6.

A system for detecting all first-time-around moving targets but rejecting stationary second-time-around targets is illustrated in FIGURE 7. This circuit, in addition to incorporating the components of FIGURE 3 which bear identical reference numerals in FIGURE 7 includes a third filter 52 labeled filter C having the response illustrated in FIGURE 6. The output of this filter is connected through an absolute value operator 54, a time-averaging circuit 56, and another absolute value operator 58 to one input of a summing circuit 60. The output of time-averaging circuit 48 is connected through an absolute value operator 62 to the other input of summing circuit 60 with the system output appearing on lead 62. The reason that FIGURES 2 and 3 are described as illustrating the basic circuit is that in many instances the final "gap filler" filter 52 of FIGURE 7 is not actually necessary since for reasonably well-separated pulse repetition frequencies the staggering tends to smooth over the nulls.

A digital type cancellor is particularly suited for moving target indicators. Destaggering the pulse repetition frequencies and storing the echo level signals over a number of repetition periods is easily done in a digital system but is difficult to accomplish in an analog delay line system. Thus, the present invention is directed to a preferred embodiment in which digital filtering is used, although other techniques may be employed.

Figure 8:
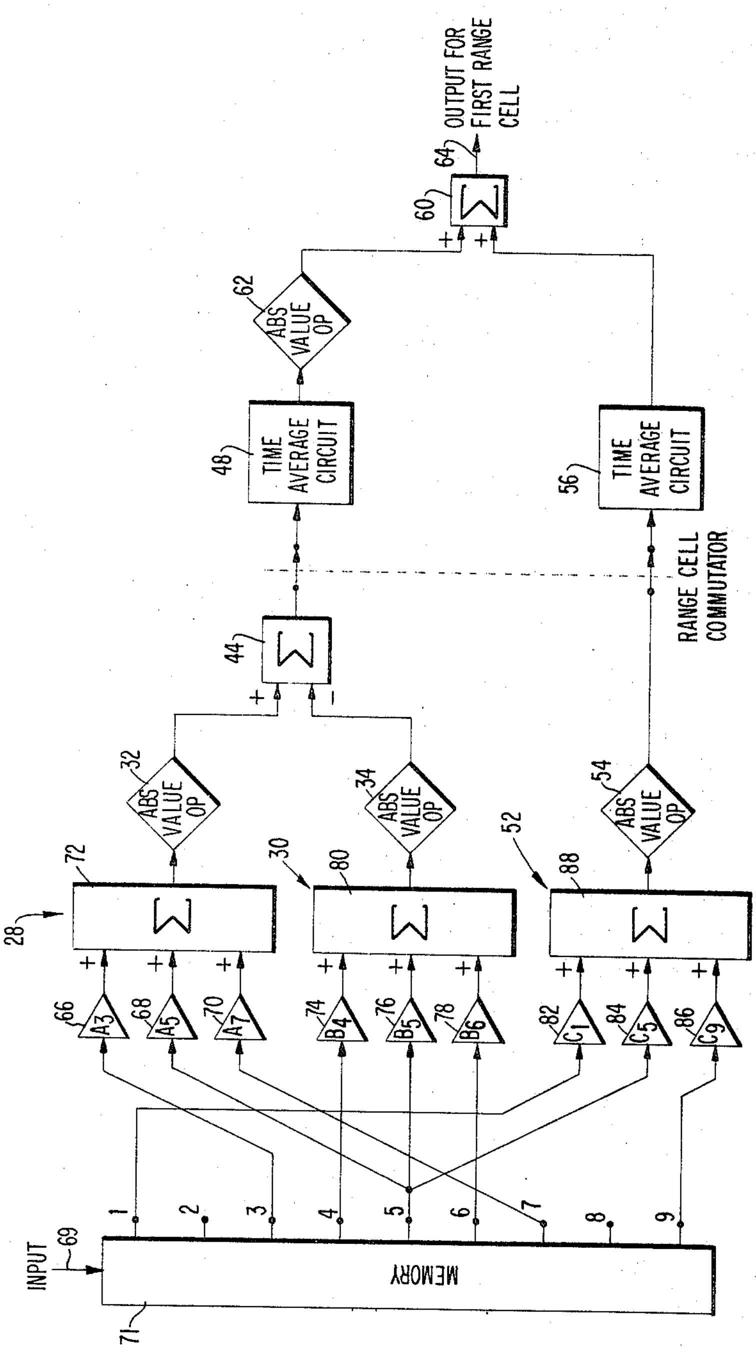
FIGURE 8 is a more detailed block diagram of a second-time-around signal cancellation circuit constructed in accordance with the present invention utilizing digital filters.
Figure 9:
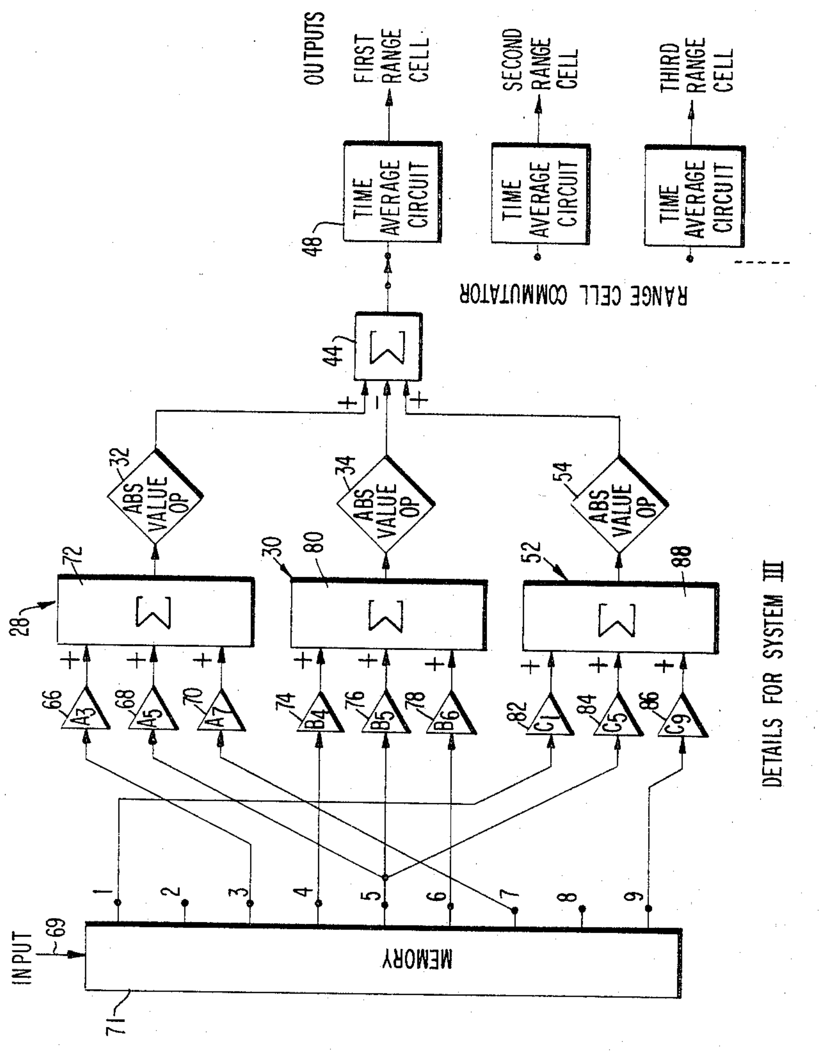
FIGURE 9 is a detailed block diagram of a modified system constructed in accordance with the present invention.

FIGURE 8 shows a system configuration incorporating digital filtering. Throughout the remainder of this disclosure, reference will be made to systems I, II and III. It is understood that system I is of the type illustrated in FIGURE 8 incorporating filters with responses as shown in FIGURES 4 and 6. System II is the same except that the filter of FIGURE 5 is substituted for the filter shown in FIGURE 4A. A third system referred to as system III is illustrated in FIGURES 9 and 10 and will be described below.

In FIGURE 8 the video input signal is applied by way of lead 69 to a digital type memory device 71. The digitized signal amplitude data for each range cell in turn is stored in memory 71 as it is received and becomes available at nine output ports labeled 1 through 9 in FIGURE 8. The input signal is bipolar video, which means that samples taken at a particular range cell appear as a pulse train with a cosine wave envelope at the target Doppler frequency.

At any instant, present signal amplitude data appears at port 1, data taken during the previous repetition period for the same range cell appears at port 2. Data taken during the period prior to that for the same range cell appears at port 3 and so on. One repetition period later, new data will appear at port 1, data that has been at port 1 wil now appear at port 2, data that had been at port 2 will now appear at port 3 and similar shifts will take place at ports 4, 5, 6, 7, 8 and 9. Previous data that had been at port 9 is simply discarded by the memory 71.

The three digital filters corresponding to filters 28, 30 and 52 of FIGURE 7 are generally labeled with the same reference numerals in FIGURE 8. Each filter is formed by a group of three weighting devices, such as devices 66, 68 and 70, for filter 28 in combination with a summing network 72. Filter 30 is similarly formed by the weighting devices 74, 76 and 78 in combination with summing network 80. Finally, digital filter 52 comprises weighting devices 82, 84 and 86 in combination with summing network 81. The weighting devices are all multipliers in the digital system of FIGURE 8 but are equivalent to amplifiers in an analog system. The weights $A_i$ $B_i$ and $C_i$ determine the filter responses. In general, for a repetition period T it can be shown that the filter response of a filter having weights $W_i$, is $$E_o/E_i=\sum_{k=-m}^{m} W_{m-k}\cos(kT) \tag{1}$$

where $W_i$ is the weight applied to the signal from the *i*th port of the memory, $W_m$ is the weight applied to the signal from the central port of the memory (port 5 as illustrated in FIGURE 8), and $W_{m-k}=W_{m+k}$. From Equation 1 and referring to FIGURES 4, 5, 6, and 8, it can be found that the weights listed in Table I under Systems I and II are suitable.

TABLE I

| Weight | System I | System II | System III |
|---|---|---|---|
| $A_3$ | ¼ | ½ | ½ |
| $A_5$ | ½ | 0 | 0 |
| $A_7$ | ¼ | ½ | ½ |
| $B_4$ | ¼ | ¼ | ¼ |
| $B_5$ | ½ | ½ | ½ |
| $B_6$ | ¼ | ¼ | ¼ |
| $C_1$ | $-\frac{1}{2}\times C_5$ | $-\frac{1}{2}\times C_5$ | $-\frac{1}{2}\times C_5$ |
| $C_5$ | *¼ | *¼ | *¾ |
| $C_9$ | $-\frac{1}{2}\times C_5$ | $-\frac{1}{2}\times C_5$ | $-\frac{1}{2}\times C_5$ |

*These may be varied somewhat to suit.

Equation 1 may be derived as follows: The filter accepts and stores an input signal $e(t)$. At any time $t$ it produces an output $e_o$ which is the weighted sum of $e(t)$, $e(t-T)$, $e(t-2T)$, etc., where T is the system repetition. Thus, $$e_o=\sum_{i=0}^{n} W_i e(t-iT) \tag{A1}$$

where the W's are the weighting factors applied.

We will only consider a symmetric filter; that is, one in which there exists some integer $m$ such that $$W_i=o,\ i>2m \tag{A2}$$

and $$W_{m+j}=W_{m-j},\ o\leq j\leq m \tag{A3}$$

If the input signal is $E_i\cos(2\pi ft-\phi)$, the output will be $$e_o=E_i\sum_{i=0}^{2\pi m} Wi\cos(2\pi ft-\phi-iT) \tag{A4}$$

As $t$ (or $\phi$) varies, the output will vary. Since the output is a sum of cosine terms with various relative phases, the output itself will be a cosine function. The desired filter response is, of course, the amplitude or peak value of $e_o$ as $t$ (or $\phi$) is varied. Thus, we set the partial derivative of $e_o$ equal to zero to find this peak:

$$o=2\pi fE_i\sum_{i=0}^{2m} W_i\sin(2\pi ft-\phi-iT) \tag{A5}$$

The value $t=(\phi+mT)/(2\pi f)$ satisfies Equation A5 as is shown below by substitution:

$$\sum_{i=0}^{2m} Wi\sin(mT-iT)=\sum_{i=0}^{m-1} W_i\sin(mT-iT)+W_m\sin(o)+\sum_{i=m+1}^{2m} W_i\sin(mT-iT) \tag{A6}$$

The first and third terms on the right hand side cancel out, as can be seen by defining new indices $k=m-i=-j$, and applying Equation A3:

$$\sum_{\shortparallel 0}^{2m} Wi\sin(mT-iT)=\sum_{k=1}^{m} Wm-k\sin(kT)+\sum_{j=1}^{mi} Wm+j\sin(-jT)=0 \tag{A7}$$

Thus, at maximum $e_o$, designated $E_o$, we do indeed have $$t=\frac{\phi+mT}{2\pi f} \tag{A8}$$

and thus substitution into Equation A4 yields the desired function:

$$\frac{E_o}{E_i}=\sum_{i=0}^{2m} Wi\cos(mT-iT)=\sum_{k=-m}^{m} W_{m-k}\cos(kT) \tag{A9}$$

As noted above, System I follows the configuration of FIGURE 8 and employs filters with responses as shown in FIGURES 4 and 6, while System II is the same system but using a filter with the response of FIGURE 5 in place of that of FIGURE 4A. A third system, having the configuration illustrated in FIGURES 9 and 10 and having weights identical to those of System II except for the gap filter, will also operate properly. This system is similar to that of FIGURE 8 with the principal exception that the absolute value operator 62 of FIGURE 8 is omitted. This is possible since the gap filler filter 52 has a large positive output at those frequencies where the average output of the subtraction network is negative.

So far, only signals appearing in a single range cell have been specifically considered. Actually, the input data gives signal amplitude for each and every range cell in sequence, all of which must be stored in the memory 72. The signals at each of the ports 1 through 9 give signal amplitudes for the range cells in sequence, each port, of course, giving data obtained during a different repetition period. Output signals for the different range cells can be separated by employing one or two time averaging circuits for each range cell desired and switching the output to each averaging circuit in turn as signals arrive from each range cell. Each range cell effectively has associated with it the circuitry illustrated in FIGURES 8 and 9, although all of the equipment except the timed averaging circuits is preferably actually time shared.

Analysis of this type of system is rather difficult, primarily because of the non-linear elements involved. Therefore, the approach has been to perform approximate analysis as a guide to choosing the repetition periods and the weighting factors, then to determine the exact response of the system by simulating both the system and the input signals on a digital computer.

As a first step, the response of the system to a single input repetition period can be readily obtained. For each input Doppler frequency, the output for each filter is determined individually, then combined in the appropriate manner. Referring to Equation 1 and FIGURES 7 and 8, we find the expression for output for Systems I and II with a single PRF input is as follows:

$$E_o/E_i = Abs\left[Abs\sum_k A_{5-k}\cos(kT) - Abs\sum_k B_{5-k}\cos(kT)\right] + Abs\left[\sum_k C_{5-k}\cos(kT)\right] \quad (2)$$

Similarly, referring to FIGURE 9, we find the expression for output for System III is as follows:

$$E_o/E_i = Abs\ Abs\sum_k A_{5-k}\cos(kT) - Abs\sum_k B_{5-k}\cos(kT) + Abs\sum_k C_{5-k}\cos(kT) \quad (3)$$

Figure 10A:
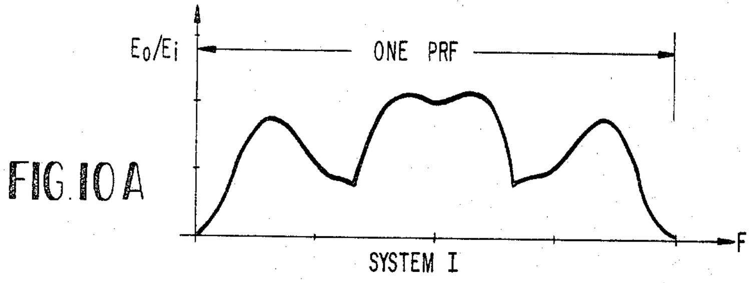
FIGURES 10A, 10B and 10C show response diagrams for three systems of the type shown in FIGURES 8 and 9 for a single pulse repetition frequency.
Figure 10B:
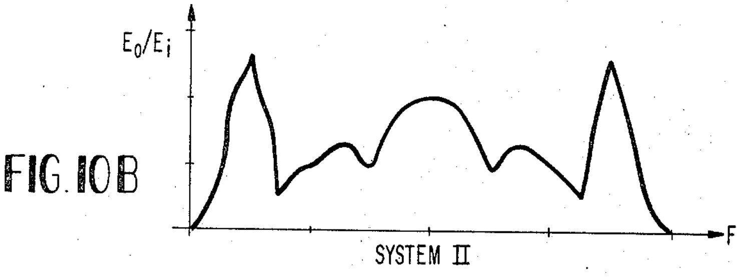
Figure 10C:
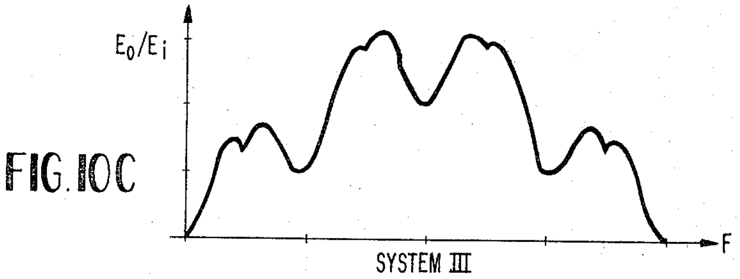

These functions are plotted in FIGURES 10A, 10B, and 10C for the weights given in Table I.

Some indication of the output with staggered PRF can be obtained by averaging the outputs that would be obtained with each PRF separately. FIGURES 11A, 11B, and 11C show results obtained in this way.

Once the weights and PRF's have been chosen, the entire system may be analyzed by actually performing the operations the filter does on synthesized input signals. An arbitrary phase angle $\phi$ is introduced and allowed to vary over all possible angles, which is equivalent to investigating an infinitely long input signal.

From the preceding description of the system, it is apparent that the signals appearing at ports 1 through 9 will have the following amplitudes:

$$V_1 = E_i\cos[w(2T_1+2T_2+2T_3+2T_4)+\phi] \quad (4)$$

$$V_2 = E_i\cos[w(2T_1+2T_2+2T_3+T_4)+\phi] \quad (5)$$

$$V_3 = E_i\cos[w(2T_1+2T_2+T_3+T_4)+\phi] \quad (6)$$

$$V_4 = E_i\cos[w(2T_1+T_2+T_3+T_4)+\phi] \quad (7)$$

$$V_5 = E_i\cos\ w(T_1+T_2+T_3+T_4)+\phi] \quad (8)$$

$$V_6 = E_i\cos[w(T_1+T_2+T_3)+\phi] \quad (9)$$

$$V_7 = E_i\cos[w(T_1+T_2)+\phi] \quad (10)$$

$$V_8 = E_i\cos[wT_1+\phi] \quad (11)$$

$$V_9 = E_i\cos[\phi] \quad (12)$$

where $T_1$, $T_2$, $T_3$, and $T_4$ are the interpulse periods which repeat in that order. As indicated in FIGURE 8, the output for Systems I and II is then:

$$E_o/E_i = \left\{\frac{1}{2\pi}\int_0^{2\pi}[Abs(A_3V_3+A_5V_5+A_7V_7) - Abs(B_4V_4+B_5V_5+B_6V_6)]d\phi\right\} + \left\{\frac{1}{2\pi}\int_0^{2\pi}[Abs(C_1V_1+C_5V_5+C_9V_9)]d\phi\right\} \quad (13)$$

while that of System III is simply $$E_o/E_i = \frac{1}{2\pi}\int_0^{2\pi}[Abs(A_3V_3+A_5V_5+A_7V_7) - Abs(B_4V_4+B_5V_5+B_6V_6 + Abs(C_1V_1+C_5V_5+C_9V_9)]d\phi \quad (14)$$

For digital computer analysis, the integrals may be approximated by summations. Some simplification can be made by using the double angle formula in Equations 4 through 12, then collecting coefficients of cos $\phi$ in Equations 13 and 14. FIGURES 12, 13A, 13B, and 13C are plots of Equations 13 and 14 using the weights and PRF's indicated.

Figure 12:
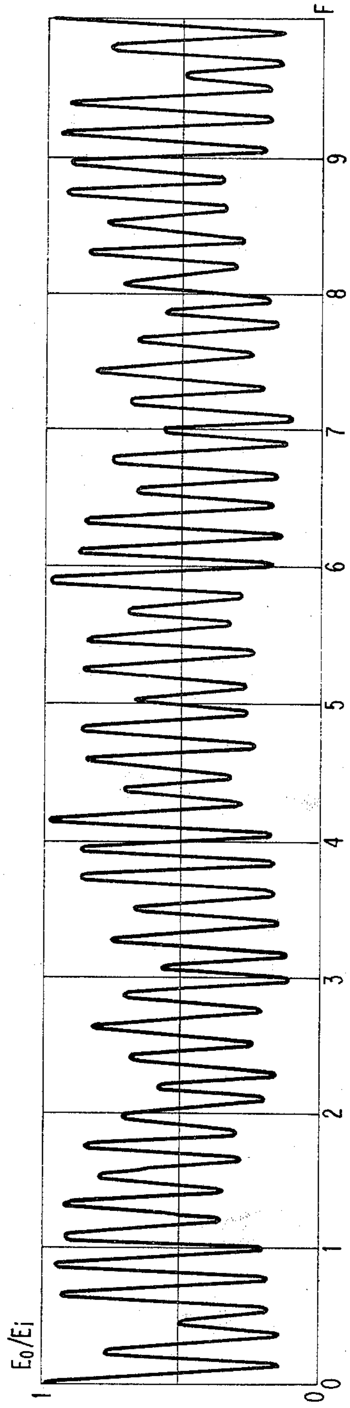
FIGURE 12 shows the frequency response for the filter of FIGURE 6.
Figure 13A:
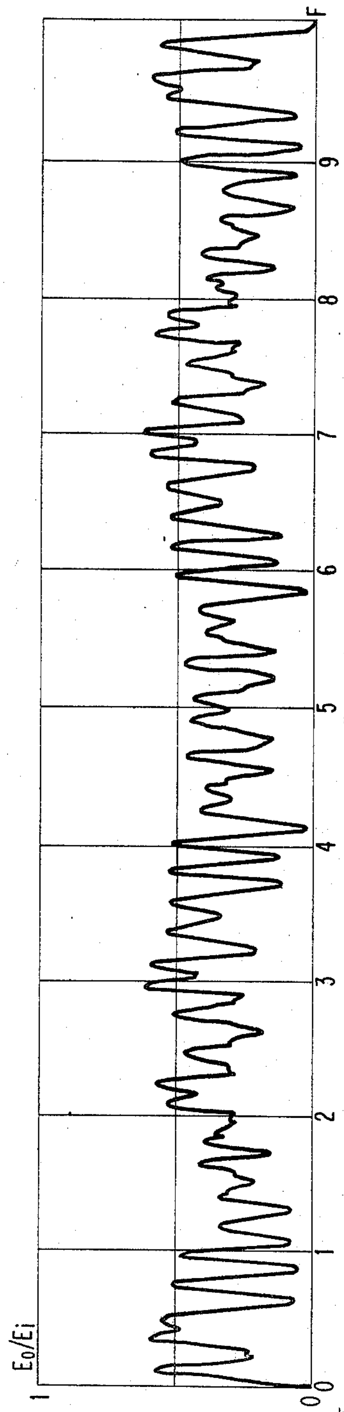
FIGURES 13A, 13B and 13C show the responses for the three weighted systems.
Figure 13B:
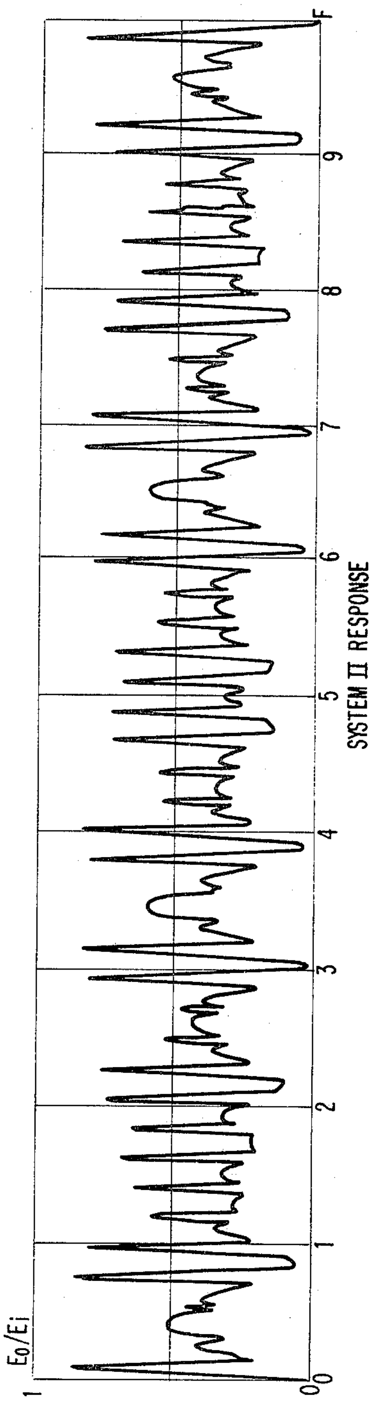
Figure 13C:
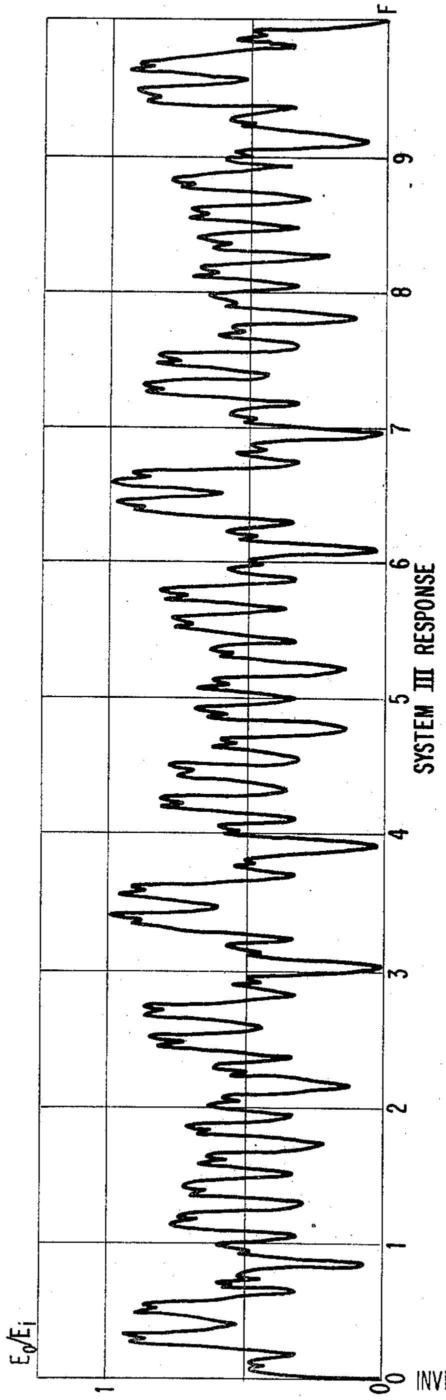
Figure 14:
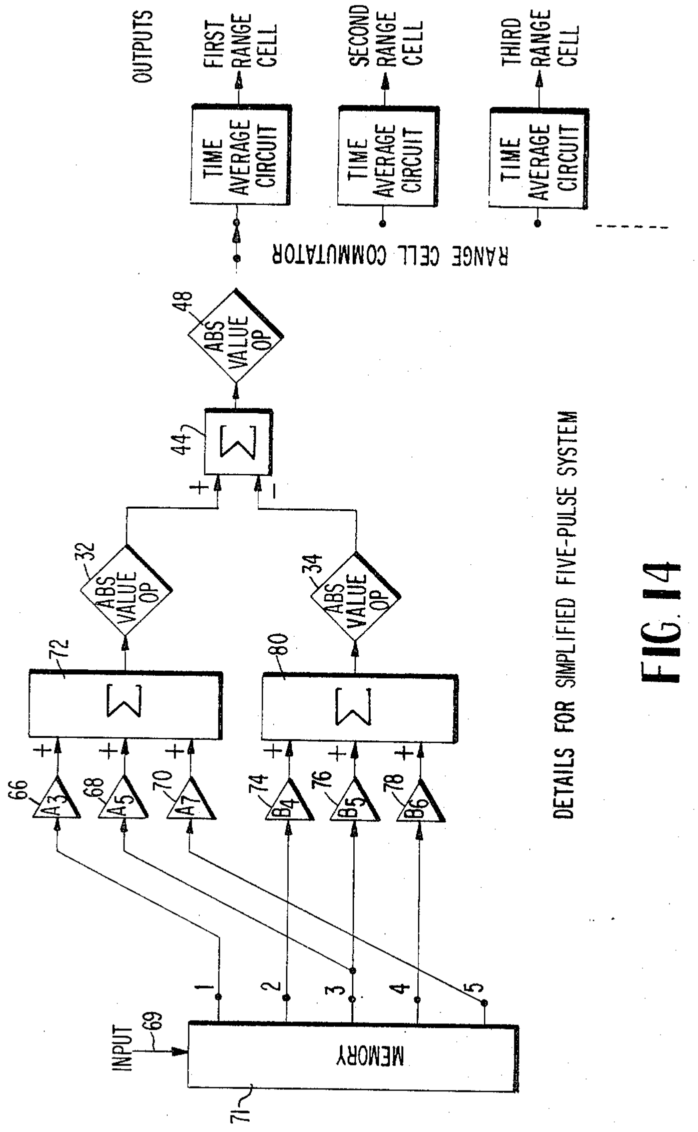
FIGURE 14 shows a simplified digital system utilizing only two digital filters in the manner of FIGURES 2 and 3.

FIGURE 11A shows the averaged frequency response of System I, FIGURE 11B shows the averaged frequency response of System II, and FIGURE 11C shows the averaged frequency response for System III. The repetition periods used for the responses plotted are 1, 1.1, 1.2, and 1.3. FIGURE 12 illustrates the response of the filler gap filter 52 to an exaggerated (times 2) scale. FIGURES 13A, 13B, and 13C, respectively, illustrate the synthesized frequency response for the systems previously described as Systems I, II and III. These responses are all illustrated for the weights given in the table above. Finally, FIGURE 14 shows a simplified digital circuit for a five-pulse system. This circuit is based upon the simplified configurations of FIGURES 2 and 3 in which the filler gap filter 52 is not required. Its mode of operation will be readily apparent in light of the above description of the previous embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a pulse-Doppler radar system having a staggered multiple pulse repetition frequency output train, the improvement comprising a filter circuit in said system for rejecting echo signals having Doppler frequencies at submultiples of the average pulse repetition frequency of said train, said filter circuit including a gap filler filter for passing signals at frequencies intermediate submultiples of the average pulse repetition frequency of said pulse train.

2. In a pulse-Doppler radar system having a staggered multiple pulse repetition frequency output train, the improvement comprising a filter circuit in said system for rejecting echo signals having Doppler frequencies at submultiples of the average pulse repetition frequency of said train, said filter circuit comprising a pair of filters connected in parallel between the video input of said system and a summing network, each of said filters comprising a summing network and a plurality of weighting devices.

3. Apparatus according to claim 2 wherein said filters each comprise three weighting devices.

4. Apparatus according to claim 2 wherein said weighting devices are multipliers.

5. Apparatus according to claim 2 wherein said filters are connected to said summing network through an absolute value operator.

6. Apparatus according to claim 5 wherein said absolute value operators are registers.

7. Apparatus according to claim 2 wherein the inputs of said filters are coupled to said video input terminal through a memory, said memory having a plurality of output ports coupled to said filters and transferring information from said video input terminal in time sequence to successive ones of said output ports.

References Cited

UNITED STATES PATENTS

| | | | |
|---|---|---|---|
| 3,031,659 | 4/1962 | Parguier | 343—7.7 |
| 3,066,289 | 11/1962 | Elbinger | 343—7.7 |
| 3,129,423 | 4/1964 | Mortley | 343—7.7 |
| 3,169,243 | 2/1965 | Kuhrdt | 343—7.7 |

RODNEY D. BENNETT, Jr., Primary Examiner

H. C. WAMSLEY, Assistant Examiner